United States Patent
He et al.

(10) Patent No.: US 6,897,381 B2
(45) Date of Patent: May 24, 2005

(54) WALL-MOUNTED ELECTRICAL DEVICE HAVING ADJUSTABLE OUTLET PRONGS

(75) Inventors: Mengtao Pete He, Scottsdale, AZ (US); Carl Triplett, Scottsdale, AZ (US); Mary J. Conway, Phoenix, AZ (US)

(73) Assignee: The Dial Corporation, Scottsdale, AZ (US)

( * ) Notice: Subject to any disclaimer, the term of this patent is extended or adjusted under 35 U.S.C. 154(b) by 18 days.

(21) Appl. No.: 10/650,136

(22) Filed: Aug. 28, 2003

(65) Prior Publication Data

US 2004/0129443 A1 Jul. 8, 2004

Related U.S. Application Data

(60) Provisional application No. 60/407,387, filed on Aug. 30, 2002.

(51) Int. Cl.[7] .................................................. H02G 3/14
(52) U.S. Cl. ........................... 174/67; 174/66; 220/241; 33/528
(58) Field of Search .............................. 174/66, 67, 53, 174/54, 60; 220/241, 242, 3.8; 33/528

(56) References Cited

U.S. PATENT DOCUMENTS

| | | |
|---|---|---|
| 1,836,600 A | 12/1931 | Jones |
| 3,262,290 A | 7/1966 | Huber |
| 3,748,438 A | 7/1973 | Costello |

(Continued)

FOREIGN PATENT DOCUMENTS

| | | |
|---|---|---|
| DE | 35 35 564 | 5/1986 |
| DE | 41 31 613 | 3/1993 |
| EP | 0 296 807 | 12/1988 |
| EP | 0 669 137 | 8/1995 |
| EP | 0 911 041 | 4/1999 |
| GB | 402507 | 12/1933 |
| GB | 2 356 815 | 6/2001 |
| WO | WO 00 76292 | 12/2000 |
| WO | WO 01 10739 | 2/2001 |
| WO | WO 01/68154 | 9/2001 |
| WO | WO 01/93919 | 12/2001 |

OTHER PUBLICATIONS

PCT International Search Report issued Dec. 17, 2003 for International Application No. PCT/US03/26511, International Filing Date Aug. 26, 2003, 4 pages.
PCT International Search Report issued Apr. 21, 2004 for International Application No. PCT/US03/26754, International Filing Date Aug. 28, 2003, 4 pages.
PCT International Search Report issued Nov. 12, 2003 for International Application No. PCT/US03/25245, International Filing Date Aug. 13, 2003, 4 pages.
PCT International Search Report issued Oct. 7, 2003 for International Application No. PCT/US03/04082, International Filing Date Feb. 12,2003, 8 pages.
PCT International Search Report issued Dec. 16, 2003 for International Application No. PCT/US03/25244, International Filing Date Aug. 13, 2003, 3 pages.

(Continued)

*Primary Examiner*—Dhiru R. Patel
(74) *Attorney, Agent, or Firm*—Snell & Wilmer LLP

(57) ABSTRACT

An electrical device capable of interfacing with multiple types of duplex receptacles includes at least one set of moveable outlet prongs that are adjustable such that they may be readily inserted into outlets of varying dimensions. Adjustability may be provided by, for example, a rotable or translatable connection between the prongs and one of the outlet plugs of the device. The prongs may be biased into position by a spring or other elastic member. By providing adjustable prongs on at least one outlet plug, the device is able to interface with both outlets in duplex receptacles of various sizes and types, including receptacles having ground fault circuit interrupter (GFCI) capabilities.

10 Claims, 4 Drawing Sheets

U.S. PATENT DOCUMENTS

| | | |
|---|---|---|
| 3,780,260 A | 12/1973 | Eisner |
| 3,895,928 A | 7/1975 | Gonzalo |
| 3,908,905 A | 9/1975 | Von Philipp et al. |
| 3,923,458 A | 12/1975 | Gonzalo |
| 3,948,445 A | 4/1976 | Andweg |
| 4,017,030 A | 4/1977 | Coplan et al. |
| 4,037,353 A | 7/1977 | Hennart et al. |
| 4,084,079 A | 4/1978 | Costello |
| 4,111,655 A | 9/1978 | Quincey |
| 4,123,741 A | 10/1978 | Kiyono et al. |
| 4,165,835 A | 8/1979 | Dearling |
| 4,171,340 A | 10/1979 | Nishimura et al. |
| 4,208,012 A | 6/1980 | Dutcher |
| 4,214,146 A | 7/1980 | Schimanski |
| 4,220,281 A | 9/1980 | Martens, III et al. |
| 4,228,124 A | 10/1980 | Kashihara et al. |
| 4,243,969 A | 1/1981 | Steinerwald et al. |
| 4,293,173 A | 10/1981 | Tricca |
| 4,294,778 A | 10/1981 | DeLuca |
| 4,346,059 A | 8/1982 | Spector |
| 4,391,781 A | 7/1983 | Van Lit |
| 4,408,813 A | 10/1983 | Koehler |
| 4,413,779 A | 11/1983 | Santini |
| 4,415,797 A | 11/1983 | Choustoulakis |
| 4,425,302 A | 1/1984 | Pons Pons |
| 4,467,177 A | 8/1984 | Zobele et al. |
| 4,518,212 A | 5/1985 | Rumble |
| 4,530,556 A | 7/1985 | Bonus |
| 4,537,351 A | 8/1985 | Wilson |
| 4,544,592 A | 10/1985 | Spector |
| 4,549,250 A | 10/1985 | Spector |
| 4,556,539 A | 12/1985 | Spector |
| 4,571,485 A | 2/1986 | Spector |
| 4,574,181 A | 3/1986 | Spector |
| 4,595,564 A | 6/1986 | Spector et al. |
| 4,631,387 A | 12/1986 | Glucksman |
| 4,658,985 A | 4/1987 | Madsen et al. |
| 4,660,764 A | 4/1987 | Joyaux et al. |
| 4,662,679 A | 5/1987 | Franck |
| 4,675,504 A | 6/1987 | Suhajda |
| 4,686,353 A | 8/1987 | Spector |
| 4,695,434 A | 9/1987 | Spector |
| 4,703,155 A | 10/1987 | Suhajda |
| 4,707,336 A | 11/1987 | Jones |
| 4,714,984 A | 12/1987 | Spector |
| 4,718,856 A | 1/1988 | Pinkerton et al. |
| 4,725,712 A | 2/1988 | Schroeder |
| 4,731,520 A | 3/1988 | Glucksman |
| 4,731,522 A | 3/1988 | Manchester |
| 4,732,321 A | 3/1988 | Dolan |
| 4,734,560 A | 3/1988 | Bowen |
| 4,739,928 A | 4/1988 | O'Neil |
| 4,743,406 A | 5/1988 | Steiner et al. |
| 4,753,389 A | 6/1988 | Davis |
| 4,777,345 A | 10/1988 | Manchester |
| 4,780,286 A | 10/1988 | Parent et al. |
| 4,795,883 A | 1/1989 | Glucksman et al. |
| 4,798,935 A | 1/1989 | Pezaris |
| 4,800,239 A | 1/1989 | Hill |
| 4,801,271 A | 1/1989 | Piper |
| 4,804,821 A | 2/1989 | Glucksman |
| 4,808,347 A | 2/1989 | Dawn |
| 4,816,973 A | 3/1989 | Atalla et al. |
| 4,830,791 A | 5/1989 | Muderlak et al. |
| 4,837,421 A | 6/1989 | Luthy |
| 4,849,606 A | 7/1989 | Martens, III et al. |
| 4,853,517 A | 8/1989 | Bowen et al. |
| 4,878,615 A | 11/1989 | Losi |
| 4,886,469 A | 12/1989 | Jseng |
| 4,915,301 A | 4/1990 | Munteanu |
| 4,919,981 A | 4/1990 | Levey et al. |
| 4,931,224 A | 6/1990 | Holzner, Sr. |
| 4,931,258 A | 6/1990 | Zlotnik et al. |
| 4,968,456 A | 11/1990 | Muderlak et al. |
| D315,789 S | 3/1991 | Muderlak |
| 4,998,671 A | 3/1991 | Leifheit |
| 5,004,435 A | 4/1991 | Jammet |
| 5,014,913 A | 5/1991 | Hoyt et al. |
| 5,015,442 A | 5/1991 | Hirai |
| 5,029,729 A | 7/1991 | Madsen et al. |
| 5,038,394 A | 8/1991 | Hasegawa et al. |
| 5,050,798 A | 9/1991 | Sulllivan |
| 5,106,317 A | 4/1992 | Taylor |
| 5,111,477 A | 5/1992 | Muderlak |
| 5,115,975 A | 5/1992 | Shilling |
| 5,121,881 A | 6/1992 | Lembeck |
| 5,126,078 A | 6/1992 | Steiner et al. |
| 5,136,684 A | 8/1992 | Lonker et al. |
| 5,147,582 A | 9/1992 | Holzner, Sr. et al. |
| 5,148,984 A | 9/1992 | Bryson, Jr. et al. |
| 5,175,791 A | 12/1992 | Muderlak et al. |
| 5,196,171 A | 3/1993 | Peltier |
| 5,201,025 A | 4/1993 | Landesberg |
| 5,217,696 A | 6/1993 | Wolverton et al. |
| 5,220,636 A | 6/1993 | Chang |
| 5,222,186 A | 6/1993 | Schimanski et al. |
| 5,223,182 A | 6/1993 | Steiner et al. |
| 5,233,680 A | 8/1993 | Fussell |
| 5,239,610 A | 8/1993 | Shao |
| 5,240,426 A | 8/1993 | Barla |
| 5,285,014 A | 2/1994 | Gilchrist |
| 5,290,546 A | 3/1994 | Hasegawa et al. |
| 5,295,845 A | 3/1994 | Changxing |
| 5,314,669 A | 5/1994 | Hamilton |
| 5,320,542 A | 6/1994 | Cheng |
| 5,339,065 A | 8/1994 | Slenker |
| 5,342,584 A | 8/1994 | Fritz et al. |
| 5,373,581 A | 12/1994 | Smith |
| 5,375,728 A | 12/1994 | West |
| 5,376,338 A | 12/1994 | Zlotnik |
| 5,382,410 A | 1/1995 | Peltier |
| D355,251 S | 2/1995 | Paulovich et al. |
| 5,394,506 A | 2/1995 | Stein et al. |
| 5,402,517 A | 3/1995 | Gillett et al. |
| D357,330 S | 4/1995 | Wong et al. |
| 5,431,859 A | 7/1995 | Tobin |
| 5,431,885 A | 7/1995 | Zlotnik et al. |
| 5,445,802 A | 8/1995 | Wendelken |
| 5,465,198 A | 11/1995 | Kellogg |
| 5,480,591 A | 1/1996 | Lagneaux et al. |
| 5,481,442 A | 1/1996 | Wiltshire et al. |
| 5,484,086 A | 1/1996 | Pu |
| 5,498,397 A | 3/1996 | Horng |
| 5,521,357 A | 5/1996 | Lock et al. |
| 5,522,008 A | 5/1996 | Bernard |
| 5,547,616 A | 8/1996 | Dancs et al. |
| 5,556,192 A | 9/1996 | Wang |
| 5,567,361 A | 10/1996 | Harper |
| 5,574,821 A | 11/1996 | Babasade |
| 5,575,992 A | 11/1996 | Kunze |
| 5,577,156 A | 11/1996 | Costello |
| 5,591,395 A | 1/1997 | Schroeder et al. |
| 5,624,230 A | 4/1997 | Taylor et al. |
| 5,634,806 A | 6/1997 | Hahn |
| 5,647,052 A | 7/1997 | Patel et al. |
| 5,647,053 A | 7/1997 | Schroeder et al. |
| 5,651,942 A | 7/1997 | Christinsen |
| 5,662,835 A | 9/1997 | Collingwood |
| 5,664,958 A | 9/1997 | Chadwick et al. |
| 5,700,430 A | 12/1997 | Bonnema et al. |

| | | |
|---|---|---|
| 5,735,460 A | 4/1998 | Eisenbraun |
| 5,747,739 A * | 5/1998 | Moeller ..................... 174/67 |
| 5,749,520 A | 5/1998 | Martin et al. |
| 5,750,498 A | 5/1998 | Soeda et al. |
| 5,765,751 A | 6/1998 | Joshi |
| 5,788,155 A | 8/1998 | Martin et al. |
| 5,788,931 A | 8/1998 | Munoz Quintana |
| 5,796,914 A | 8/1998 | Gatzemeyer et al. |
| 5,805,768 A | 9/1998 | Schwartz et al. |
| 5,810,265 A | 9/1998 | Cornelius et al. |
| 5,813,873 A | 9/1998 | McBain et al. |
| 5,832,648 A | 11/1998 | Malone |
| 5,873,529 A | 2/1999 | Johnson |
| 5,875,968 A | 3/1999 | Miller et al. |
| 5,884,808 A | 3/1999 | Muderlak et al. |
| 5,899,381 A | 5/1999 | Gordon et al. |
| 5,903,710 A | 5/1999 | Wefler et al. |
| 5,926,614 A | 7/1999 | Steinel |
| 5,928,605 A | 7/1999 | Bonnema et al. |
| 5,932,204 A | 8/1999 | Joshi |
| 5,937,140 A | 8/1999 | Leonard et al. |
| 5,940,577 A | 8/1999 | Steinel |
| 5,944,223 A | 8/1999 | Klima et al. |
| 5,945,094 A | 8/1999 | Martin et al. |
| 5,955,701 A | 9/1999 | Schockner et al. |
| 5,957,701 A | 9/1999 | McMillin |
| 5,970,643 A | 10/1999 | Gawel, Jr. |
| 5,976,503 A | 11/1999 | Martin et al. |
| 5,998,735 A | 12/1999 | Patterson, Jr. |
| 6,021,254 A | 2/2000 | Hunter |
| 6,031,967 A | 2/2000 | Flashinski et al. |
| 6,032,930 A | 3/2000 | Calino |
| 6,036,536 A | 3/2000 | Chiu |
| 6,044,202 A | 3/2000 | Junkel |
| 6,045,374 A | 4/2000 | Candeloro |
| 6,050,551 A | 4/2000 | Anderson |
| 6,051,788 A | 4/2000 | Nichols |
| 6,078,728 A | 6/2000 | O'Rourke et al. |
| 6,085,026 A | 7/2000 | Hammons et al. |
| 6,097,881 A | 8/2000 | DeWitt et al. |
| 6,099,137 A | 8/2000 | McCormack et al. |
| 6,101,315 A | 8/2000 | Steinel, Jr. |
| 6,104,866 A | 8/2000 | DeWitt et al. |
| 6,104,867 A | 8/2000 | Stathakis et al. |
| D430,659 S | 9/2000 | Zaraboza et al. |
| 6,123,935 A | 9/2000 | Wefler et al. |
| 6,141,496 A | 10/2000 | Sundberg et al. |
| 6,148,143 A | 11/2000 | Steinel, Jr. |
| 6,156,088 A | 12/2000 | Cardarelli |
| 6,197,262 B1 | 3/2001 | Del Ben |
| 6,197,263 B1 | 3/2001 | Blount |
| 6,201,187 B1 * | 3/2001 | Burbine ..................... 174/60 |
| 6,227,118 B1 | 5/2001 | Nance |
| 6,236,807 B1 | 5/2001 | Ruffolo et al. |
| 6,249,645 B1 | 6/2001 | Smith |
| 6,254,065 B1 | 7/2001 | Ehrensperger et al. |
| 6,264,548 B1 | 7/2001 | Payne, Jr. et al. |
| 6,269,979 B1 | 8/2001 | Dumont |
| 6,270,720 B1 | 8/2001 | Mandish |
| 6,275,651 B1 | 8/2001 | Voit |
| 6,278,840 B1 | 8/2001 | Basaganas Millan |
| 6,285,830 B1 | 9/2001 | Basaganas Millan |
| 6,289,176 B1 | 9/2001 | Martter et al. |
| 6,302,559 B1 | 10/2001 | Warren |
| 6,315,959 B2 | 11/2001 | Mandish |
| 6,328,791 B1 | 12/2001 | Pillion et al. |
| 6,342,676 B1 | 1/2002 | Ha |
| 6,349,168 B1 | 2/2002 | Jaworski |
| 6,352,210 B1 | 3/2002 | Requejo |
| 6,354,513 B1 | 3/2002 | Basaganas Millan |
| 6,361,752 B1 | 3/2002 | Demarest et al. |
| 6,364,673 B1 | 4/2002 | Lee |
| 6,368,564 B1 | 4/2002 | Smith |
| 6,371,815 B1 | 4/2002 | Wetzel et al. |
| 6,374,044 B1 | 4/2002 | Freidel |
| 6,374,045 B1 | 4/2002 | Basaganas Millan |
| 6,381,408 B1 | 4/2002 | Jaworski et al. |
| 6,441,304 B1 * | 8/2002 | Currier et al. ................ 174/53 |
| 6,559,381 B2 * | 5/2003 | Shotey et al. ................ 174/66 |
| 6,603,924 B2 | 8/2003 | Brown et al. |
| 6,657,144 B2 * | 12/2003 | Savicki et al. .............. 200/296 |
| 6,703,562 B1 * | 3/2004 | Pacheco ..................... 174/66 |
| 6,714,725 B2 | 3/2004 | Grone et al. |
| 2001/0031225 A1 | 10/2001 | Mandish |
| 2001/0053283 A1 | 12/2001 | Levine et al. |
| 2002/0144992 A1 | 10/2002 | Vieira |
| 2003/0138241 A1 | 7/2003 | Ambrosi et al. |

OTHER PUBLICATIONS

PCT International Search Report issued Dec. 16, 2003 for International Application No. PCT/US03/25246, International Filing Date Aug. 13, 2003, 3 pages.

PCT International Search Report issued Dec. 19, 2003 for International Application No. PCT/US03/25243, International Filing Date Aug. 13, 2003, 4 pages.

Brochure–"Decora Devices," by Leviton, date unknown, Section A, pps. A1–A36.

* cited by examiner

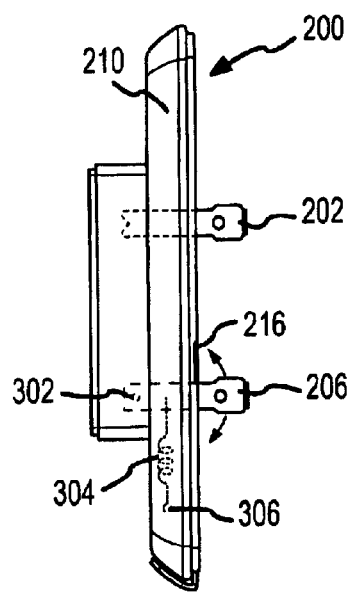
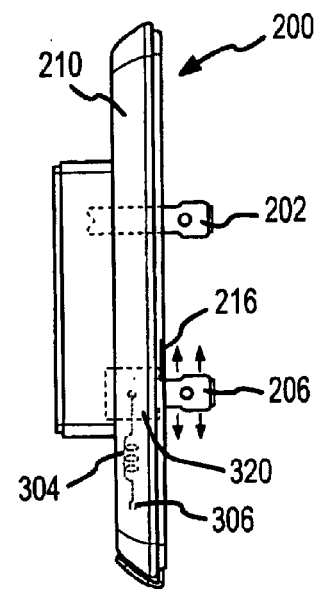
FIG.3A    FIG.3B
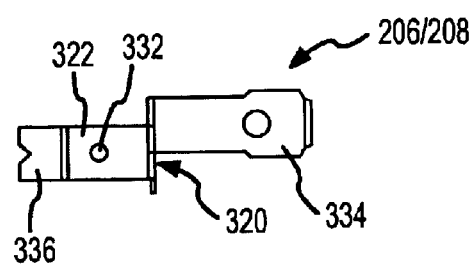
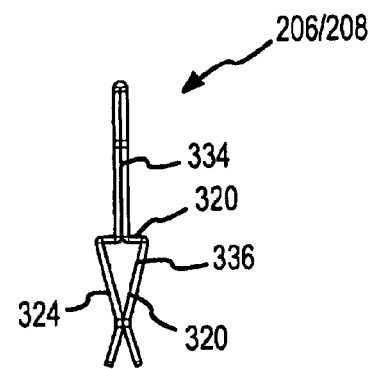
FIG.3C    FIG.3D

WALL-MOUNTED ELECTRICAL DEVICE HAVING ADJUSTABLE OUTLET PRONGS

CROSS-REFERENCE TO RELATED APPLICATIONS

This application claims priority to U.S. Provisional Patent Application Ser. No. 60/407,387 entitled "Wall-Mounted Electrical Device Having Adjustable Outlet Prongs," filed Aug. 30, 2002, and is incorporated herein by reference.

FIELD OF INVENTION

This invention generally relates to devices which mount to electrical receptacles, and more particularly, to devices capable of adapting to variously sized and/or shaped receptacles.

BACKGROUND OF THE INVENTION

More recently, fragrance dispensers have become increasingly sleek in design for improved stability and appearance. Such new fragrance dispensers may also include two sets of outlet prongs that can be inserted into both outlets of a conventional duplex (i.e. dual-outlet) receptacle for improved stability.

Similarly, many other devices may interface with one or both outlets of duplex (or four-plex, six-plex, etc.) receptacles, such as battery chargers, timers, audio/visual devices, nightlights, wireless control devices, air filters, computing devices and the like.

As will be discussed in greater detail hereinbelow, the present invention is particularly suited for use with devices configured for interfacing with (or "plugging into") both outlets in a conventional duplex wall receptacle.

Various types of conventional outlet receptacles have been used for many years. Typical receptacles include two or more electrical outlets within a housing that is generally covered with a faceplate. The faceplate may also cover a switch, dimmer or other electrical control as well. A standard duplex receptacle is shown in FIG. 1A. In recent years, many receptacles (such as those used in bathrooms and garages) incorporate ground fault circuit interrupters (GFCI or GFI) that break electrical continuity for the receptacle if a short or other unsafe condition occurs. GFCI receptacles typically include "TEST" and/or "RESET" buttons that can be manipulated to test the GFCI circuitry as appropriate. A conventional duplex GFCI receptacle is shown in FIG. 1B. Both standard and GFCI receptacles are readily available from the Leviton corporation of Little Neck, N.Y., as well as from numerous other sources. Likewise, in various other circumstances, receptacles may be "non-standard" (e.g., outlets in older homes, different countries, etc.)

The physical and electrical specifications of electrical receptacles are set forth in various standards published by the Underwriters Laboratory (U.L.) of Northbrook, Ill. and by the Institute of Electrical and Electronic Engineers (IEEE), as well as in various municipal building codes. Although both GFCI and non-GFCI outlets are commonly found in most homes and businesses, the two types of outlets generally have slightly different physical dimensions. For example, the two outlets of a standard duplex outlet are approximately 1.5 inches apart, whereas the two outlets of a GFCI duplex outlet are approximately 1.675 inches apart. Although this difference appears to the casual observer to be relatively small, the difference is large enough to affect devices that are intended to interface with both outlets in the duplex receptacle. If the outlet prongs of the device are rigidly fixed for standard duplex outlets, for example, the prongs may be difficult to insert into a GFCI outlet. Similarly, minor variations in receptacle standards for various countries, manufacturers or locales may affect the ease-of-insertion of certain fragrance dispensers and other dual-plug devices.

Accordingly, it is desirable to create a device that adapts to interface with variously sized receptacles, such as, for example, both standard and GFCI outlet receptacles of varying sizes and dimensions.

SUMMARY OF THE INVENTION

In accordance with various exemplary embodiments of the present invention, an electrical device includes at least one set of prongs that are adaptable such that they may be readily inserted into receptacles of varying sizes. Adaptability may be provided through, for example, a movable connection between the prongs and one or more of the outlet plugs. According to one embodiment, an electrical device for interfacing with a duplex electrical receptacle suitably includes a housing, a first plug disposed within the housing and having a first set of prongs configured to interface with the first outlet of the receptacle, and a second plug disposed within the housing and having a second set of prongs configured to interface with the second outlet of the receptacle, wherein the second set of prongs is moveably coupled with respect to the housing to accommodate variations in distance between the first outlet and the second outlet. These and other aspects of the invention shall become more apparent when read in conjunction with the accompanying drawing figures and the attached detailed description of exemplary embodiments.

BRIEF DESCRIPTION OF THE DRAWING FIGURES

The features and advantages of the present invention are hereinafter described in the following detailed description of exemplary embodiments to be read in conjunction with the accompanying drawing figures, wherein like reference numerals are used to identify the same or similar parts in the similar views, and:

FIG. 3A is a cutaway side view of an exemplary device having a rotatable outlet prong;

FIG. 3B is a cutaway side view of an exemplary device having a translatable outlet prong;

Figure 4A:
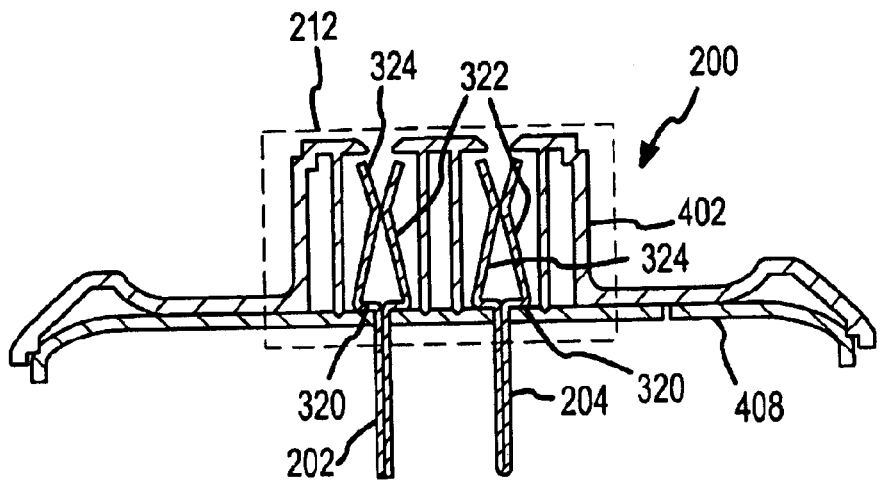
Figure 4B:
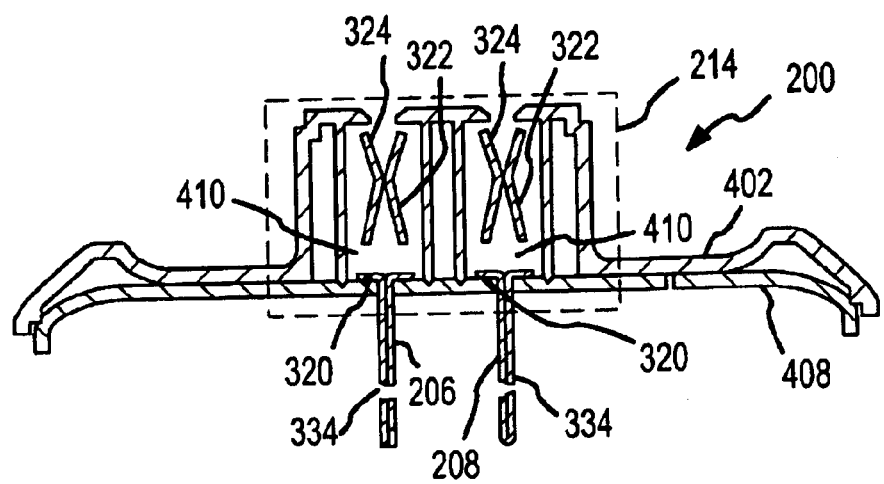

FIGS. 3C-D are side and top views, respectively, of an exemplary outlet prong; and FIGS. 4A-B are cross-sectional views of an exemplary vapor dispensing device.

DETAILED DESCRIPTION OF EXEMPLARY EMBODIMENTS

The following description is of exemplary embodiments of the invention only, and is not intended to limit the scope, applicability or configuration of the invention in any way. Rather, the following description is intended to provide a convenient illustration for implementing various embodiments of the invention. As will become apparent, various changes may be made in the function and arrangement of the elements described in these embodiments without departing from the scope of the invention as set forth herein.

For example, in the context of the present invention, the method and apparatus hereof may find particular use in connection with electric air fresheners. However, generally speaking, various other devices, having any number of components and features (e.g., battery chargers, timers, audio/visual devices, nightlights, wireless control devices, air filters, computing devices and the like) are suitable for use in accordance with the present invention. In this context, various embodiments of the present invention may be described herein in conjunction with specific devices and it should be appreciated that the scope of the present invention should not be considered limited to those specifically mentioned herein.

In accordance with the present invention, an electrical device for insertion into an electrical receptacle which is capable of adapting to receptacles of varying sizes and dimensions. Briefly, as used herein "adaptive" refers to the ability to adjust to fit a differently sized or spaced receptacle, and as such, shall be synonymous with "adjustable" and other like meaning terms.

Figure 1B:
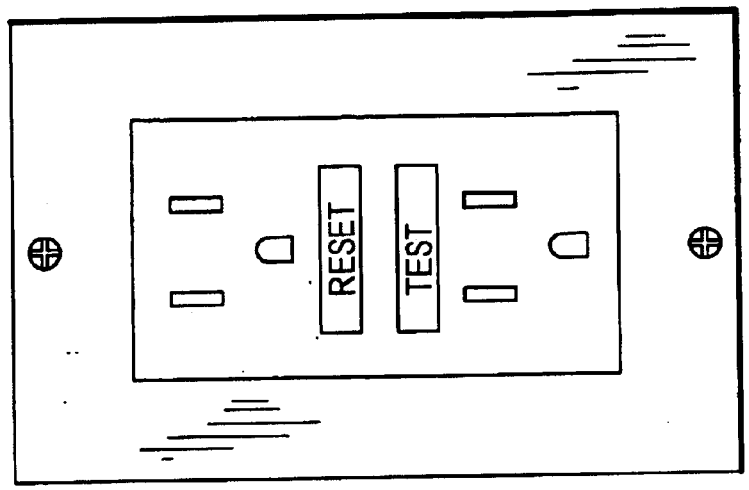
FIGS. 1A and 1B are front views of exemplary standard and GFCI duplex receptacles.
Figure 1A:
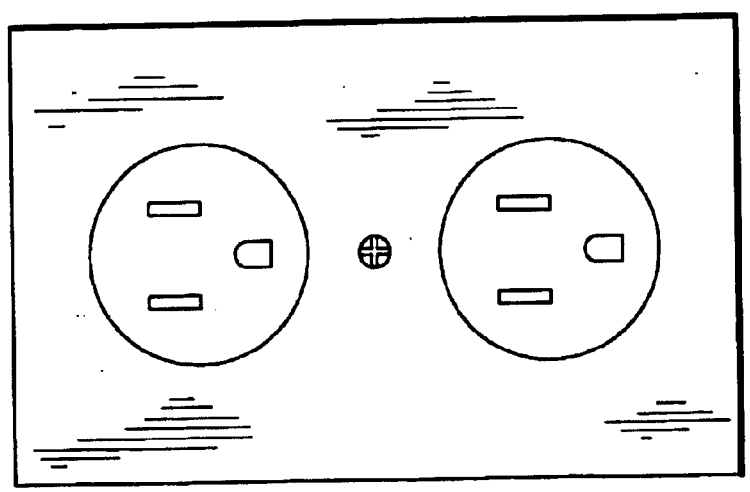
Figure 2:
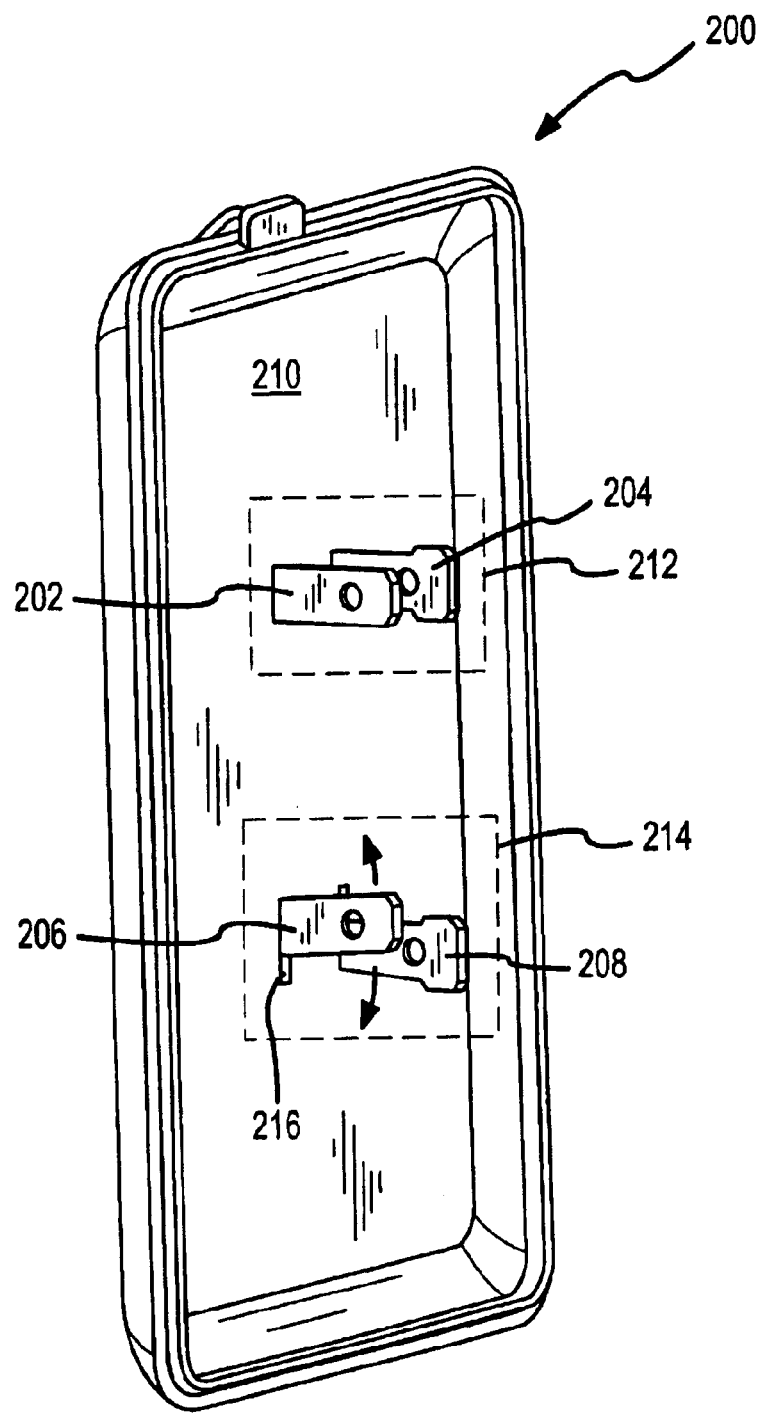
FIG. 2 is a perspective view of an exemplary device having adjustable outlet prongs.

With reference to FIG. 2, an example of a wall-mounted device 200 (such as an air freshener, battery charger or the like) in accordance with the present invention suitably includes a housing 210 and two or more outlet plugs 212 and 214 capable of electrically interfacing with an electrical receptacle having two or more outlets. For example, the non-limiting embodiment shown in FIG. 2 is a "duplex" device. Examples of duplex devices, such as a duplex air freshener, are described in U.S. patent application Ser. No. 10/074,529, entitled "VAPOR-DISPENSING DEVICE," filed Feb. 12, 2002 and U.S. patent application Ser. No. 10/222,501, entitled "METHOD AND APPARATUS FOR DUAL-OUTLET DISPENSER," filed Aug. 16, 2002 the entirety of which are hereby incorporated by reference.

In the context of a duplex embodiment, each of the two plugs 212 and 214 suitably include two or more outlet prongs (e.g. prongs 202 and 204 for plug 212, and prongs 206 and 208 for plug 214) that can be inserted into the holes of a conventional electrical receptacle. In accordance with various electrical standards, one of the prongs 204/208 corresponding to the electrically active or "hot" portion of the electrical receptacle may be slightly larger in size than the other prong 202/206, which generally corresponds to "neutral" or "ground". Although not shown in FIG. 2, a third "ground" prong may also be present on alternate embodiments of each electrical plug 212/214. Similarly, other configurations (such as for non-standard current or non-U.S. standard plug configurations) likewise fall within the scope of the present invention.

Because device 200 includes multiple plugs 212/214, each of which is designed to be inserted into one outlet in a multi-outlet receptacle, each prong 206/208 of one or more of the plugs 214 is configured to adapt or otherwise move, rotate, translate, etc. and/or to accommodate receptacles of varying dimensions. For example, in one embodiment, each prong 206/208 is free to move within the confines of a slot 216 formed in housing 210. The size of slot 216 suitably corresponds to the extent of movement required by a particular embodiment. For device 200 to accommodate both conventional North American standard and GFCI duplex receptacles, for example, a movement of about ⅛–¼ inch (or about 1–4 millimeters) may be sufficient. Of course the exact amount of movement needed will vary from embodiment to embodiment, and may be based upon electrical standards, building codes and the like.

In various embodiments, to adapt, as a user inserts device 200 into an electrical receptacle, the movable prongs 206/208 suitably translate and/or rotate as appropriate to interface with the outlet. For example, in the embodiment shown in FIG. 2, prongs 202/204 are inserted into the topmost outlet of the receptacle, and movable prongs 206/208 suitably adjust to the outlet holes of the bottom outlet as device 200 is inserted into the receptacle. Prong placement and insertion may be further aided by designing the length of prongs 206/208 to be shorter than the length of non-movable prongs 202/204, for example, or by shaping movable prongs 206/208 with a beveled, slanted, rounded or similar-shaped edge.

With reference now to FIG. 3A, a device 200 which adapts via rotatable prongs 206/208 is shown. Although prong 208 is not visible in the view shown in FIG. 3A, the structures shown for prong 206 could be readily implemented on the other prongs of device 200. Prong 206 is suitably fashioned with a notch or hole that is capable of accepting a pin 302 or other outcropping so that the pin serves as a pivot point for prong 206. Pin 302 is any pivot point that is rigidly fixed with respect to housing 210. In one embodiment, pin 302 is fashioned as an outcropping of housing 210 through appropriate fabrication techniques such as injection molding. Alternatively, pin 302 may be implemented as a separate metal, plastic other object that may be inserted into a groove, hole or other recession in housing 210 such that pin 302 is rigidly held in place. A spring 304 or other elastic member (such as a plastic finger, a rubber band, or any other structure) may be optionally provided to bias prong 206 into a desired initial position or to hold prong 206 in place prior to or after insertion. Spring 304 may be coupled to any point of prong 206, and may be attached to housing 210 at any anchor point 306.

In this embodiment, prong 206 rotates about pin 302 in response to the position of the outlet receptacle to adapt to the receptacle. For example, as an external force is applied to device 200, prong 206 suitably rotates about pin 302 such that prong 206 is guided within slot 216 to the outlet hole as appropriate. As with the prior embodiments, prong 206 may be shaped in any convenient fashion to assist in guiding prong 206 to the outlet hole.

With reference now to FIG. 3B, another exemplary embodiment of a device 200 suitably includes one or more prongs 206/208 that adapt by translation with respect to housing 210 to accommodate receptacles of varying dimensions. Prong 206 suitably has a front face 320 that interfaces with housing 210 to allow prong 206 to slide or otherwise laterally move within the confines of groove 216. In a further embodiment, prong 206 includes a tongue, flange or other outcropping that slides within a groove or other guide on housing 210 to guide the lateral movement of prong 206 with respect to housing 210. As with the prior embodiment, an optional spring 304 or other biasing mechanism may also be provided to bias prong 206 toward an anchor point 306 or other point on housing 210. Similar to the rotational embodiment described above, in operation, an insertion force provided by the user overcomes the bias force of spring 304 to allow prong 206 to move laterally within groove 216 to interface with the outlet receptacle.

FIGS. 3C-D are side and top views, respectively, of an exemplary prong 206/208 that may be used to implement rigid or movable prongs in a device 200. With reference to FIGS. 3C-D, an exemplary prong 206/208 suitably includes two legs 322 and 324 that receive the prongs of an external appliance such as a hair dryer, lamp, curling iron, kitchen appliance or the like. Prong 206/208 also includes a front face 320 that slides or rotates with respect to housing 210 as described above in conjunction with FIGS. 3A-B, and may include a hole 332 in any appropriate location to receive spring 304 or another elastic biasing member. As best seen in FIG. 3C, prongs 206/208 may be formed such that the portion 336 internal to housing 210 (FIG. 2) is not aligned with the external portion 338. In such embodiments, the non-linear structure of prong 206/208 further enhances rotation, translation or other movement as may be appropriate. Prongs 206/208 may be fashioned from any available material such as metal or plastic. In a further embodiment, prongs 206/208 are made from an electrically-conductive material such as copper, aluminum or the like.

FIGS. 4A-B show top and cutaway views of a device which adapts using movable outlet prongs similar to the device illustrated in FIGS. 3A-D. An exemplary device 200 suitably includes a housing with one or more outlet faces 404/406 capable of receiving the prongs of an electrical plug from an external device (e.g. a radio, hair dryer, curling iron, electric razor, clock, lamp, kitchen appliance, or the like). Outlet faces 404/406 suitably correspond to the two electrical plugs 212/214 disposed within housing 210, as described more fully below. Housing 210 may be fashioned of thermoformed or injection-molded plastic, metal, ceramic, glass or any other convenient material. Either or both of plugs 212 and 214 may be formed with the exemplary structures shown in FIGS. 4A-4B, or with any other plug structure.

With reference to FIGS. 4A-B, housing 210 of device 200 suitably includes a front face 402 and a back face 404 encompassing plugs 212/214, as well as the various components applicable to the type of device the present invention is embodied in. Each plug 212/214 includes a set of prongs 202/204, 206/208 that interface with the prongs of an external device. In the stationary prong structure shown in FIG. 4A, each prong 202/204 is formed to include legs 320/322 as described above to electrically connect the prongs of the external device with one of the outlets in the receptacle. Prongs 202/204 may be formed such that front face 320 of each prong is rigidly held in place within the back face 404 to prevent movement of the prongs with respect to housing 210. In the movable structure shown in FIG. 4B, the prongs of an external device are guided and held in place by legs 322 and 324, which may be physically isolated from the external sliding portion 334 (FIG. 3C). A gap 410 may be provided such that prongs 206/208 are allowed to translate along front face 320, as guided by slot 216 (FIG. 2). Alternatively, a rotational, translational or other structure such as those described above could be used.

For the sake of brevity, conventional electrical and mechanical design techniques used in developing various multiplexing devices (and the various components thereof) are not described in detail herein. Accordingly, devices disclosed herein may be readily modified to create equivalent embodiments through application of general electrical and mechanical principles. In a still further embodiment, the uppermost set of prongs may be configured to adjust to variations in receptacle size in addition to or in place of the lowermost prongs, as shown in the Figures herein. Moreover, although the general concepts of self-adjustability have been described with reference to a vapor dispensing device herein, these concepts may be readily applied to other equivalent electrical devices such as air filters, nightlights, audio speakers, wireless control devices, timers and the like.

The particular implementations shown and described herein are examples of the invention and are not intended to otherwise limit the scope of the invention in any way. In this context, the corresponding structures, materials, acts and equivalents of all elements described herein, are intended to include any structure, material or acts for performing the functions described herein and include those now known or hereafter devised.

What is claimed is:

1. An electrical device for interfacing with a duplex electrical receptacle having a first and a second outlet, the electrical device comprising:

a housing;

a first plug disposed within the housing and having a first set of prongs configured to interface with the first outlet; and a second plug disposed within, the housing and having a second set of prongs configured to interface with the second outlet, wherein the second set of prongs is moveably coupled with respect to the housing to accommodate variations in distance between the first outlet and the second outlet.

2. The electrical device of claim 1 wherein the first set of plugs is rigidly coupled with respect to the housing.

3. The electrical device of claim 1 wherein the second set of prongs is rotably coupled to the second plug.

4. The electrical device of claim 3 further comprising a pin coupling the second set of prongs to the second plug.

5. The electrical device of claim 1 wherein the second set of prongs is slidably coupled to the second plug.

6. The electrical device of claim 5 further comprising a pin coupled to the second set of prongs, and wherein the pin is configured to slide within a channel formed within the second plug.

7. The electrical device of claim 1 further comprising an elastic member coupling the second set of prongs to the second plug.

8. The electrical device of claim 7 wherein the elastic member is a spring.

9. The electrical device of claim 1 wherein, the housing further comprises a first and a second outlet face configured to receive an electrical plug from an external device.

10. The electrical device of claim 9 wherein each of the first set and the second set of prongs comprise at least one leg configured to interface with the electrical plug of the external device.

* * * * *